Patented July 5, 1938

2,122,886

UNITED STATES PATENT OFFICE 2,122,886

PROCESS OF POLYMERIZATION

Barnard M. Marks, Arlington, N. J., assignor to E. I. du Pont de Nemours & Company, Wilmington, Del., a corporation of Delaware No Drawing. Application December 11, 1936, Serial No. 115,351

6 Claims. (Cl. 260—2)

This invention relates to a process of polymerizing unsaturated organic compounds and, more particularly, to the polymerization in granular form of the esters of acrylic, methacrylic, and homologous acids in an aqueous vehicle.

To obtain polymeric organic compounds in a finely divided granular form particularly suited for use in molding compounds, a process has been used heretofore in which the monomeric unsaturated organic compound to be polymerized is dispersed in the form of droplets in an aqueous medium containing a suitable buffer agent and a granulating agent, and the mixture, while being agitated, is subjected to polymerizing conditions, usually elevated heat, whereby the droplets of monomeric compound are converted to granules of solid polymer which are filtered off. It has been recognized that the filtrate in this process contains an appreciable amount of the compound being polymerized, partly in monomeric form and partly in polymeric form but so finely divided that it passes through the filtering medium, as well as that portion of the granulating agent which has not become adsorbed upon the granules of polymer filtered out. These residues have heretofore been discarded regularly with the filtrate because no method of economically recovering them could be devised.

The process outlined above is referred to as a "granulation" process as contrasted to an "emulsion" process which is similar except that the monomeric compound is dispersed in the aqueous medium to such an extent that the polymer subsequently formed is in colloidal sized particles. To separate the polymer from the aqueous vehicle in the emulsion process, a coagulating agent is added to the colloidal emulsion, whereas the large proportion of particles in the granulation process are of sufficient size to be filtered off, no coagulating agent being used. The present invention relates to the granulation process.

In the polymerization of methyl methacrylate and similar esters by the granulation process, one of the most satisfactory granulating agents is polymethacrylic acid, the use of which for this purpose has been disclosed in United States application Serial No. 15,668, filed April 10, 1935, in the name of Daniel E. Strain, entitled "Polymerization process". An advantage of this particular granulating agent is that its presence in the polymer, as a result of adsorption, is comparatively unobjectionable. But with polymethacrylic acid, as well as with other known granulating agents, it has been difficult to secure uniformity of size of granule throughout each batch and to avoid the formation of agglomerations of granules.

An object of the present invention is to provide an improved technique in the polymerization of unsaturated organic compounds by the granulation process. A further object is to improve the economy of the process, the uniformity of particle size of the polymer formed and the clearness and color of the polymer formed.

The above objects are accomplished according to the present invention by using an aqueous vehicle for the polymerization in granular form of an unsaturated polymerizable organic compound, comprising in substantial part the aqueous vehicle in which has previously been polymerized in granular form and filtered therefrom an ester from the group consisting of the esters of acrylic, methacrylic, and homologous acids.

More specifically, the present invention comprises dispersing a monomeric ester of acrylic, methacrylic, or a homologous acid in an aqueous vehicle containing a granulating agent, preferably polymethacrylic acid, and a buffering agent to give the vehicle a pH of 5.5 to 8.0, subjecting the mixture to polymerizing conditions to form a granular polymer, filtering off said polymer, and using at least a part of the filtrate obtained, together with added water and buffering agent, as the aqueous vehicle in which a second batch of granular polymer is formed.

The present invention resides in the unexpected discovery that the filtrate of aqueous vehicle recovered after the polymerization of the esters of acrylic, methacrylic, or homologous acids, by the granulation process may be made to serve as the source of granulating agent of high quality for use in a subsequent batch. It has been discovered that the granulating effect of the recovered filtrate is, in general, stronger than that of the initial aqueous vehicle, prior to the polymerization of the ester in it, and this makes it appear that a substance, or substances, of granulating effect is, or are, formed as a by product of the reaction of polymerization since it is well established that an appreciable portion of the granulating agent is adsorbed on the granules of polymer and hence can no longer be in the filtrate.

The following examples illustrate specific embodiments of the invention:—

*Example 1.*—A batch "A" for granulation polymerization of methyl methacrylate was made up of:

| | | |
|---|---|---|
| Methyl methacrylate | grams | 100 |
| Benzoyl peroxide | do | 1 |
| Distilled water | do | 350 |
| Buffer solution | do | 10 |
| Polymethacrylic acid | do | 1 |

The buffer solution was an aqueous solution containing:

| | | |
|---|---|---|
| Disodium acid phosphate | grams | 1.71 |
| Monosodium phosphate | do | 0.09 |

The benzoyl peroxide was dissolved in the methyl methacrylate and the solution filtered.

The polymethacrylic acid was dissolved in the distilled water and then the buffering solution added and the resulting solution filtered. This aqueous vehicle then had a pH of approximately 7.5.

The monomeric methyl methacrylate containing the dissolved benzoyl peroxide was added to the aqueous vehicle in a kettle provided with a stirrer and reflux. The stirrer was operated at a speed sufficient to maintain the methyl methacrylate continuously in the form of droplets, and the mixture was heated to a temperature of 80–82° C. At the end of about 45 minutes polymerization was complete and the little solid granules of polymer were separated from the aqueous vehicle, washed and dried.

The filtrate from this batch, not including the wash waters, amounted to about 360 cc. This filtrate was next used as the aqueous vehicle, instead of a freshly prepared duplicate of the aqueous vehicle used for this purpose in the first batch, and polymerization of a second equal quantity of methyl methacrylate, batch "B", was carried out under the same conditions of stirring, temperature, time and pH. The polymer obtained in this second run was of extremely small particle size, approaching that of an emulsion and correspondingly difficult to filter.

The fact that the granules of polymer in batch "B" were of extremely small size is an indication that the granulating effect of the filtrate from batch "A" was stronger than that of the initial aqueous solution used in batch "A". In other words, the loss of polymethacrylic acid from the aqueous phase of batch "A" through adsorption upon the granules of polymer was more than counterbalanced by the formation of a by product having granulating powers.

Next was carried out a polymerization of a batch duplicating batch "A" and designated batch "C". This also yielded an aqueous filtrate of about 360 cc. Half of this filtrate from batch "C" was used as half of the aqueous vehicle for the polymerization of another batch of the same size, designated as "D—1". The remainder of the aqueous vehicle for batch "D—1" was made up of distilled water plus buffering agent; i. e., batch "D—1" contained the following ingredients:

| | |
|---|---|
| Methyl methacrylate | grams 100 |
| Benzoyl peroxide | do 1 |
| Filtrate from "C" | cc 180 |
| Distilled water | grams 175 |
| Buffer solution | do 5 |

Polymerization was carried out under the same conditions of temperature, time, pH, and speed of stirring as before. The product of batch "D—1" was more uniformly granulated than that of "A" or "C" and also smaller in particle size, but coarser than the product of batch "B".

Another batch "D—2" was then made up, in which two-thirds of the aqueous vehicle was made up of new material and one-third of filtrate from batch "C". Polymerization of this batch was conducted in a similar manner as before. The particle size of the resulting polymer was uniform and somewhat larger than in batches "A" and "C". In each instance the batches were subjected to the same washing treatment.

The polymers produced in batches "D—1" and "D—2", in addition to being of appreciably more uniform particle size throughout the batch, were also comparatively free from agglomerations of particles and, furthermore, when molded by heat and pressure, they yielded articles of color and clearness superior to those of articles molded from the polymer of batch "C".

From the above example, it will be apparent to those skilled in the art that it is feasible to use as a source of granulating agent in the granulation process, the filtrate from a previous batch which has been polymerized by the granulation process and that the use of such filtrate is, unexpectedly, preferable to the use of a fresh solution of polymethacrylic acid, or other equivalent granulating agent, in that its use results in an improvement in the uniformity of granulation, in a reduction in the tendency toward formation of agglomerations of particles, and in an improvement in the clearness and color of the resulting polymer. The polymer made according to the present invention is more easily washed to satisfactory clearness and color. The use of a filtrate as here disclosed is also definitely preferable to the use of a fresh solution of granulating agent in that it reuses the unconverted or partially converted monomer and also any polymer of colloidal dimensions which have not been removed by filtration in the previous batch. These residues are completely salvaged, in so far as the filtrate is reused, since they enter into the reaction of the subsequent batch.

The factors influencing the formation of granulating agent in the course of the polymerization reaction are not fully understood but it is believed they include the temperature prevailing, the duration of the reaction, the size of the particles of material undergoing polymerization, and the pH of the reaction mixture. From a practical point, it is necessary to adjust the initial pH of the aqueous vehicle used, comprising filtrate and new ingredients, to a point between 5.5 and 8.0, since the polymer produced in a more acid vehicle is apt to be marred by opaque white specks and since the use of a more alkaline vehicle results in undesirable fineness of the polymer. It is preferred to have the initial pH of the aqueous vehicle between 6 and 7.5. In general, the higher the initial pH of the aqueous vehicle, within operative limits, the less granulating agent is required.

The identity of the granulating agent formed in the filtrates here considered, or the amount of it present in a given filtrate, does not need to be actually known since the proper proportion of filtrate to be used in conjunction with new ingredients to form the aqueous vehicle for a subsequent batch is readily established by actual trial. Since the strength of the granulating influence to achieve a given result will depend not only upon the result desired but also upon the size of the batch, the presence of auxiliary ingredients such as plasticizers, the relative proportions of aqueous and dispersed phases, the pH, the temperature, and the mechanical equipment, i. e., size and shape of container and design and speed of agitating device, it is evident that the makeup of the aqueous vehicle formed partially of filtrate from a previous batch and partially of new ingredients must be adapted, on the basis of actual trial, to the purpose and conditions of operation. This is no more than would be necessary where the aqueous vehicle is made up entirely of fresh ingredients for each batch.

Thus it has been shown in a comparison of batches "D—1" and "D—2" in Example 1 that the amount of filtrate used in proportion to new ingredients influences definitely the particle size of the polymer obtained. Assuming, in the case illustrated, that the particle size yielded by the conditions of batch "C" is that which is required, then the proper ratio of filtrate to new ingredients for the next batch must lie between the 1—1 ratio of batch "D—1", which yields too fine a product, and the 1—2 ratio of batch "D—2" which yields to coarse a product. The proportions must therefore be worked out to suit a given set of conditions but, once the proper proportion of filtrate to be used under the given set of conditions has been established, a condition of equilibrium will be reached so that successive batches, involving the use in each of the same proportion of filtrate from its predecessor will yield polymerized products of the same character.

The separation and washing of the granular polymer are preferably carried out by decantation because of the tendency toward channeling on a filter. In the use of filtrates according to the present invention, wash waters are not included.

In Example 1 the application of the invention where the granulating agent is polymethacrylic acid is illustrated and this is a preferred granulating agent. Nevertheless, the invention is likewise applicable where the granulation process is carried out using other known granulating agents such as starch, polymethacrylamide and its derivatives, glycol cellulose, and other granulating agents heretofore used. The development of a granulating agent as a by product takes place analogously in reactions conducted with these other granulating agents and thus the latter may be used in one or more of the first batches of a series but omitted as early in the series as it is found that sufficient granulating agent has been formed to provide the necessary granulating effect unassisted for a subsequent batch.

The following examples illustrate the use of other granulating agents:

*Example 2.*—The procedure of Example 1 in forming batch "A" was duplicated exactly except that 1.0 gram of polymethacrylamide was used in place of the 1.0 gram of polymethacrylic acid. A suitable portion of the resulting filtrate was used in conjunction with added water and buffering agent to provide the aqueous vehicle for a second batch. In successive batches the residue of the initially added granulating agent became smaller and smaller and the process continued to produce its own granulating agent.

*Example 3.*—The same procedure was used as in Example 2 except that 0.3 gram of starch was used in place of the 1.0 gram of polymethacrylamide and similar results were obtained.

The formation of a granulating agent during the granulation polymerization and its presence in the filtrate is characteristic of polymerization by the granulation process as applied to the esters of acrylic, methacrylic, and homologous acids. That is, to the various alkyl and aryl acrylates, methacrylates, and ethacrylates, and the like, which are known and the invention is thus applicable to the polymerization of this general class of compounds, either singly or as a mixture.

The invention is also applicable to the granulation polymerization of other unsaturated polymerizable organic compounds such as the vinyl esters, styrol, and the amides and nitriles of acrylic acid and its homologues, to the extent that the filtration from the granulation polymerization of the esters of acrylic, methacrylic, and homologous acids can be used as the source of the granulating agent. On the other hand, these vinyl esters, styrol, and the like, do not in turn themselves give rise to the formation of a granulating agent and hence the filtrate obtained from the granular polymerization of these compounds cannot be used in successive batches as a source of granulating agent. These compounds are radically different from the esters of acrylic, methacrylic, and homologous acids in this respect.

The following examples are given to illustrate variations of the process of the present invention:

*Example 4.*—The procedure of Example 1, batch "A", was followed using isobutyl methacrylate instead of methyl methacrylate. A portion of the aqueous filtrate from this batch was used to make up, without added granulating agent but with added water and buffering agent, a new aqueous vehicle for another batch, as in Example 1, batches "D—1" and D—2". The results obtained were comparable to those obtained in Example 1.

*Example 5.*—A portion of the filtrate from Example 4 was used with added water and buffering agent but no added granulating agent to form the aqueous vehicle for the polymerization of vinyl acetate in granular form. The polymerized vinyl acetate in granular form was readily obtained without the use of other granulating agent.

It will be understood that there may be added to the compound being polymerized, prior to the polymerization reaction, the usual auxiliary ingredients including plasticizers, soluble colors, pigments, and mold lubricants.

Benzoyl peroxide has been specifically mentioned as the polymerization catalyst and it is a preferred one. Other polymerization catalysts can be employed in the present invention, if desired. Likewise, it will usually be more practical to employ heat to induce polymerization but, as will be understood by those skilled in the art, actinic light and other means may be employed in the process of the present invention if it is desired.

While the present invention is not primarily concerned with the so-called "emulsion" polymerization process, the same materials used as granulating agents in the granulation process may be used as the emulsifying agent in the emulsion process, the dispersion of monomer in the aqueous vehicle being carried out to the point where the particles are of substantially colloidal size in the latter case. The filtrates herein considered may be used to form a part or all of the aqueous vehicle in the emulsion process but the filtrate obtained after the coagulation of the colloidal particles of polymer in the emulsion process, is not adapted for further use in subsequent batches.

The reuse of recovered aqueous filtrate as an ingredient, in suitable proportion, of a subsequent batch, to which no granulating agent is independently added, has the advantages, over the use of a freshly prepared aqueous phase, of improving the uniformity of granulation of the polymer, of reducing its tendency to agglomerate or coalesce, of improving the color and clearness of the polymer, and of effecting economy in the process. Not only is there saved the expense of preparing separately polymethacrylic acid or other granulating agent, but also there are saved the residues of monomeric and polymeric ester contained in the reused filtrate or portion thereof, which residues, amounting sometimes to several per cent of the ester in the batch, have heretofore been lost in the discarding of the filtrates.

As many apparently widely different embodiments of this invention may be made without departing from the spirit and scope thereof, it is to be understood that the invention is not limited to the specific embodiments thereof except as defined in the appended claims.

I claim:

1. In the batch process of polymerizing an ester from the group consisting of the esters of acrylic, methacrylic, and homologous acids, to obtain a granular polymer by dispersing the monomeric ester in an aqueous vehicle containing a granulating agent, subjecting same to polymerizing conditions, and filtering off the granular polymer, the step comprising polymerizing one batch in an aqueous vehicle containing a substantial part of the filtrate obtained from a preceding batch.

2. In the batch process of polymerizing an ester from the group consisting of the esters of acrylic, methacrylic, and homologous acids, to obtain a granular polymer by dispersing the monomeric ester in an aqueous vehicle containing a granulating agent, subjecting same to polymerizing conditions, and filtering off the granular polymer, the steps comprising mixing at least a substantial part of the filtrate obtained from one batch with water and a buffering agent in an amount to give the aqueous mixture a pH of 5.5-8.0, and dispersing the monomeric ester forming a subsequent batch in said aqueous mixture and subjecting same to polymerizing conditions.

3. In the batch process of polymerizing methyl methacrylate to obtain a granular polymer by dispersing the monomeric methyl methacrylate in an aqueous vehicle containing a granulating agent, subjecting same to polymerizing conditions, and filtering off the granular polymer, the step comprising polymerizing one batch in an aqueous vehicle containing a substantial part of the filtrate obtained from a preceding batch.

4. In the batch process of polymerizing methyl methacrylate, to obtain a granular polymer by dispersing the monomeric methyl methacrylate in an aqueous vehicle containing a granulating agent, subjecting same to polymerizing conditions, and filtering off the granular polymer, the steps comprising mixing at least a substantial part of the filtrate obtained from one batch with water and a buffering agent in an amount to give the aqueous mixture a pH of 5.5-8.0, and dispersing the monomeric methyl methacrylate forming a subsequent batch in said aqueous mixture and subjecting same to polymerizing conditions.

5. In the batch process of polymerizing an ester from the group consisting of the esters of acrylic, methacrylic, and homologous acids, to obtain a granular polymer by dispersing the monomeric ester in an aqueous vehicle containing a granulating agent from the group consisting of polymethacrylic acid, polymethacrylamide, starch, and glycol cellulose, subjecting same to polymerizing conditions, and filtering off the granular polymer, the step comprising polymerizing one batch in an aqueous vehicle containing a substantial part of the filtrate obtained from a preceding batch.

6. In the batch process of polymerizing methyl methacrylate to obtain a granular polymer by dispersing the monomeric methyl methacrylate in an aqueous vehicle containing polymethacrylic acid as a granulating agent, subjecting same to polymerizing conditions, and filtering off the granular polymer, the steps comprising mixing at least a substantial part of the filtrate obtained from one batch with water and a buffering agent in an amount to give the aqueous mixture a pH of 5.5-8.0, dispersing the monomeric methyl methacrylate forming a subsequent batch in said aqueous mixture and subjecting same to polymerizing conditions.

BARNARD M. MARKS.